(12) United States Patent
Sheshagiri et al.

(10) Patent No.: US 9,015,189 B2
(45) Date of Patent: *Apr. 21, 2015

(54) METHOD AND SYSTEM FOR PROVIDING INFORMATION USING A SUPPLEMENTARY DEVICE

(75) Inventors: Mithun Sheshagiri, Oakland, CA (US); Simon J. Gibbs, San Jose, CA (US); Alan Messer, Los Gatos, CA (US); Anugeetha Kunjithapatham, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

This patent is subject to a terminal disclaimer.

(21) Appl. No.: 13/462,767

(22) Filed: May 2, 2012

(65) Prior Publication Data

US 2012/0222059 A1  Aug. 30, 2012

Related U.S. Application Data

(63) Continuation of application No. 11/823,005, filed on Jun. 26, 2007, now Pat. No. 8,195,650.

(60) Provisional application No. 60/904,044, filed on Feb. 28, 2007.

(51) Int. Cl.
*G06F 17/30* (2006.01)

(52) U.S. Cl.
CPC .... *G06F 17/30997* (2013.01); *G06F 17/30796* (2013.01); *G06F 17/3082* (2013.01); *G06F 17/3084* (2013.01)

(58) Field of Classification Search
CPC .............. G06F 17/30997; G06F 17/30477; G06F 17/30991; G06F 17/30864
USPC ........... 707/722, 999.003, 736, 769, E17.141; 725/14

See application file for complete search history.

(56) References Cited

U.S. PATENT DOCUMENTS 5,809,471 A * 9/1998 Brodsky ........................ 704/275
6,334,127 B1  12/2001 Bieganski et al.

(Continued)

FOREIGN PATENT DOCUMENTS

KR   1020020005147 A   1/2002
KR   1020020006810       1/2002

(Continued)

OTHER PUBLICATIONS

Livingston, K. et al., "Beyond Broadcast," 8th International Conference on Intelligent User Interfaces, Jan. 2003, pp. 260-262, Association for Computing Machinery, New York, NY.

(Continued)

*Primary Examiner* — Phong Nguyen
(74) *Attorney, Agent, or Firm* — Sherman IP LLP; Kenneth L. Sherman; Hemavathy Perumal

(57) ABSTRACT

A method and system for providing access to information via a supplementary device is provided. User access to primary information via a primary device is monitored. Key information related to the primary content is obtained by extracting and analyzing metadata sources for the primary information. Then, supplementary information related to the primary information is obtained based on the key information. The supplementary information is provided for user access via the supplementary device.

20 Claims, 7 Drawing Sheets

(56) References Cited

U.S. PATENT DOCUMENTS

| | | | |
|---|---|---|---|
| 6,438,579 B1 | 8/2002 | Hosken | |
| 7,162,473 B2 | 1/2007 | Dumais et al. | |
| 2006/0064734 A1* | 3/2006 | Ma | 725/136 |
| 2007/0236613 A1* | 10/2007 | Foss | 348/734 |
| 2007/0298885 A1* | 12/2007 | Tran | 463/37 |
| 2008/0235393 A1 | 9/2008 | Kunjithapatham et al. | |
| 2012/0208639 A1* | 8/2012 | Reynolds et al. | 463/36 |
| 2012/0256835 A1* | 10/2012 | Musick et al. | 345/161 |

FOREIGN PATENT DOCUMENTS

| | | |
|---|---|---|
| KR | 1020040052339 A | 6/2004 |
| KR | 1020060027226 A | 3/2006 |
| WO | WO 01/37465 | 5/2001 |
| WO | WO 02/43310 | 5/2002 |
| WO | WO 2005/055196 | 6/2005 |
| WO | WO 2007/000411 | 1/2007 |

OTHER PUBLICATIONS

Apple Inc., Apple iTunes, http://www.apple.com/itunes/, Apr. 28, 2003.

Babaguchi, N. et al., "Intermodal Collaboration: A Strategy for Semantic Content Analysis for Broadcasted Sports Video," IEEE International Conference on Image Processing, Sep. 2003, pp. 13-16, vol. 1, Barcelona, Spain.

Brill, E.' "A Simple Rule-Based Part of Speech Tagger," Third Conference on Applied Natural Language Processing, Mar. 1992, pp. 152-155, Trento, Italy.

Google Inc., Google Search Engine, http;//www.google.com, Aug. 1998.

Google Inc., Google Desktop Search, http://desktop.google.com, Oct. 15, 2004.

Benzinger, M. et al, "Query-free news search," May 2003, Proceedings on the 12th International Conference on World Wide Web, Budapest, Hungary.

Livingston, K. et al., "Beyond broadcast: a demo," Jan. 2003, In Proceedings of the 8th international Conference on intelligent User interfaces, ACM Press, New York, NY, 325-325.

Microsoft Corporation, Microsoft Windows Media Player, http://www.microsoft.com/windows/windowsmedia/, Feb. 1999.

Microsoft Corporation, MSN TV, http://www.webtv.com/pc, Feb. 2006.

Opera Software ASA, Opera Browser for Devices, http://www.opera.com/products/devices/, Mar. 2006.

Rau Lisa, F. et al, "Domain-independent summarization of news," Jun. 1994, In Summarizing Text for Intelligent Communication, pp. 71-75, Dagstuhl, Germany.

Spalti, M.' "Finding and Managing Web Content with Copernic 2000,"Sep. 2000, Library Computing, Westport, pp. 217-221, vol. 18, No. 3.

Tjondronegoro, D. et al., "Extensible detection and indexing of highlight events in broadcasted sports video," Jan. 2006, Proceedings of the 29th Australasian Computer Science Conference, Hobart, Australia.

Wachman, J. et al., "Tools for Browsing a TV Situation Comedy Based on Content Specific Attributes," Mar. 2001, Multimedia Tools and Applications, v.13 n.3, p. 255-284.

Yahoo Search Engine, http://search.yahoo.com, Dec. 1998.

Zhuang, Y. et al, "Applying semantic association to support content-based video retrieval," Oct. 1998, International workshop on Very Low Bitrate Video Coding (VLBV' 98).

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

Notification of Transmittal of the International Search Report and the Written Opinion of the International Searching Authority for International Application No. PCT/KR2008/001558, dated Jun. 26, 2008, 10 pages.

International Search Report and the Written Opinion dated May 15, 2008 for International Application No. PCT/KR2008/000537 from Korean Intellectual Property Office, 16 pages, Seo-gu, Daejeon, Republic of Korea.

U.S. Non-Final Office Action for U.S. Appl. No. 11/823,005 mailed Jan. 21, 2010.

U.S. Final Office Action for U.S. Appl. No. 11/823,005 mailed Jul. 9, 2010.

U.S. Non-Final Office Action for U.S. Appl. No. 11/823,005 mailed Oct. 27, 2010.

U.S. Final Office Action for U.S. Appl. No. 11/823,005 mailed Apr. 28, 2011.

U.S. Advisory Action for U.S. Appl. No. 11/823,005 mailed Jul. 6, 2011.

U.S. Notice of Allowance for U.S. Appl. No. 11/823,005 mailed Feb. 17, 2012.

* cited by examiner

METHOD AND SYSTEM FOR PROVIDING INFORMATION USING A SUPPLEMENTARY DEVICE

CROSS REFERENCE TO RELATED APPLICATIONS

This application is a continuation of pending U.S. patent application Ser. No. 11/823,005, filed on Jun. 26, 2007, which claims priority from U.S. Provisional Patent Application No. 60/904,044, filed Feb. 28, 2007, both of which are incorporated herein by reference in their entirety for all purposes.

FIELD OF THE INVENTION

The present invention relates to providing information to devices, and in particular to providing information to electronic devices in a network.

BACKGROUND OF THE INVENTION

The number of networked electronic devices such as consumer electronics (CE) devices in home networks is on the rise and so is the amount of data stored therein. Consumers store and access several types of content (e.g., movies, photos, broadcast television (TV), cable TV programs) on/via such devices in their home networks. Further, the amount of information available on the Internet via the World Wide Web is on the rise.

Given the large amount of data/information available on a home network and on the Internet, it is very likely that consumers (users) can find extensive information on the Internet related to at least a portion of the data stored on their home devices. Moreover, many users are as interested in accessing information on the Internet as they are in accessing data on their home networks. As such, there have been attempts at providing information of interest to users.

Some existing approaches do enable display of commercial information on a TV screen, next to or in the place of, an ongoing TV program. However, this leads to disruption in viewing the TV program. There is, therefore, a need for providing information of interest to a user without disrupting content being accessed by the user.

SUMMARY OF THE INVENTION

The present invention provides a method and system for providing access to information via a supplementary device. In one embodiment this involves monitoring user access to primary information via a primary device and extracting and analyzing data from metadata sources for the primary information to obtain key information, then obtaining supplementary information related to the primary information based on the key information, and providing the supplementary information via a supplementary device for user access.

Obtaining supplementary information includes providing the user with one or more key information related to the primary information, and upon user selection of one or more key information, obtaining supplementary information related to the selected key information. Obtaining the supplementary information related to the selected key information includes searching external sources for result information related to the selected key information. A user interface is generated which includes the result information for display. In one example, the user interface is displayed on the supplementary device, while in another example the user interface is displayed on the primary device under the control of the supplementary device.

These and other features, aspects and advantages of the present invention will become understood with reference to the following description, appended claims and accompanying figures.

DETAILED DESCRIPTION OF THE INVENTION

The present invention provides a method and system for providing information using a supplementary device, wherein the information is related to content being accessed via a primary device. In one embodiment, the present invention provides a mechanism that enables a user to access primary information (e.g., content) via a primary device, and access supplementary information that is related to primary information, via a supplementary device. The supplementary device interacts with the primary device and provides supplementary information related to the primary information being accessed via the primary device.

In one example wherein the primary device comprises a TV for viewing TV programs, the present invention provides access to information related to a TV program on a supplementary device such as a portable device (e.g., PDA, cell phone, laptop), without disrupting the TV program on the TV. Since the TV program is not disrupted, watching the TV program on the TV can continue while related information is provided on the portable device. A TV screen is typically not optimal for displaying textual information such as web pages due to distance between a viewer and the TV screen. According to the present invention, in one example a supplementary device can be maintained close to a viewer for easier viewing of information (e.g., text on web pages) related to a TV program. Further, since the related information is displayed on the supplementary device rather than the TV screen, viewing of the TV program can continue without disruption or change. Further, the supplementary device provides more privacy for viewing the related information than if the related information was displayed on the TV screen along with, or instead of, the TV program.

Figure 1:
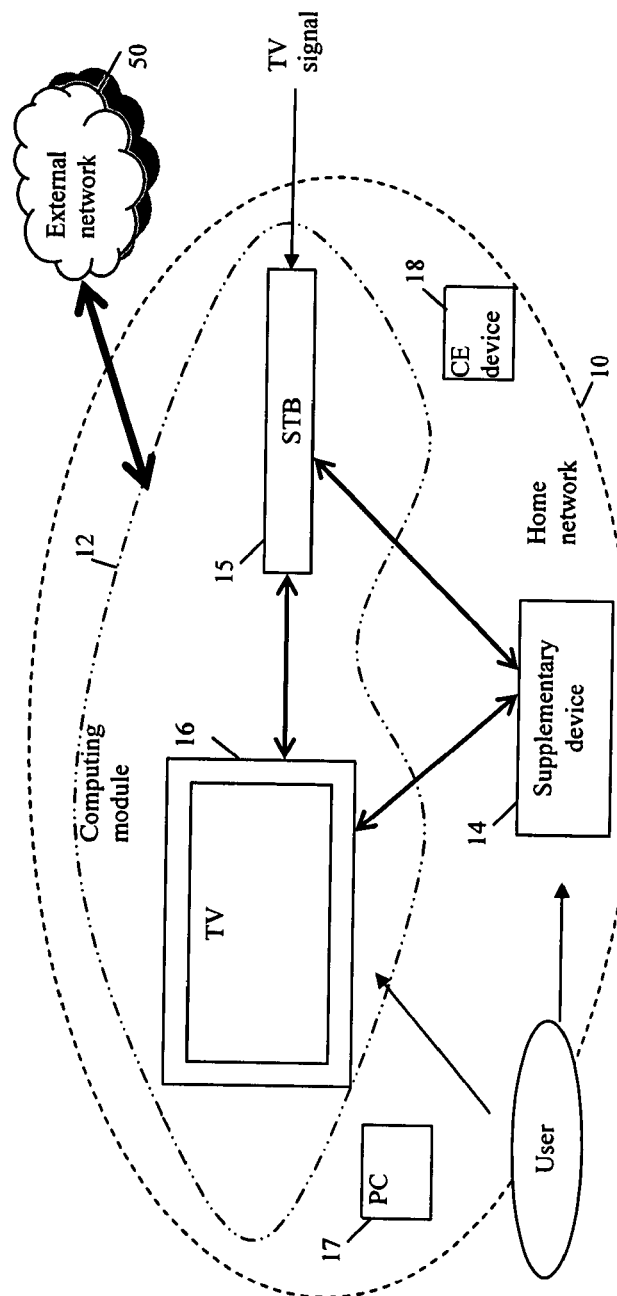
FIG. 1 shows a functional block diagram of an example network implementing aspects of the present invention.

FIG. 1 shows a block diagram of an example system 10 such as a home local area network (LAN), implementing an embodiment of the present invention. The network 10 can be wired, wireless, or a combination thereof. The network 10 includes a primary device comprising a computing module 12 and a supplementary device 14 such as a portable electronic device that can communicate with the computing module 12. The network 10 can further include other devices such as a personal computer PC 17, a CE device 18, etc. One or more devices in the network 10 can implement the Universal Plug and Play (UPnP) protocol for communication there-between, while other network communication protocols (e.g., Jini, HAVi, IEEE 1394, IEEE 802.11, Bluetooth) can also be used. The network 10 is connected to an external network 50 such as the Internet, data sources, databases, content providers, etc. The computing module 12 includes a TV 16 and a Set-Top Box (STB) 15 that receives a TV signal. The computing module 12 can also be the TV 16 itself or the STB 15 that can control the display on the TV 16. User activity in accessing content is monitored. Data related to a program being watched on the TV 16 is captured by the computing module 12 using information sources including metadata such as closed-captions, electronic program guide (EPG), etc. Key information (e.g., keywords or key phrases) are extracted from such data and displayed to the user. Example techniques for capturing contextual information from metadata sources and selecting keywords are described further below.

The keywords are not only displayed on the TV 16 for the user but are also displayed on the supplementary device 14. The supplementary device 14 uses a protocol like HTTP, Bluetooth, etc., to obtain the keywords from the computing module 12. The keywords can be used by a contextual data extractor to form queries for finding additional information such as web pages using search engine (e.g., Yahoo!), local and Internet multimedia content such as songs and videos, or content such as documents from the PC. In one example, the keywords are displayed on the supplementary device 14 and said web pages and content are provided only on the supplementary device 14. This can be suitable for configurations where the TV cannot access the Internet/home-network by itself or the computing module 12 cannot display graphics on the TV.

In another example, keywords are displayed on the TV 16 as well as the supplementary device 14, and the user is provided the option to either view related web pages or content on the TV or the supplementary device 14. When the user chooses to display the related content on the TV, the supplementary device 14 downloads the content and displays it on the TV. When the user chooses to view the related content on the supplementary device 14, the content is either downloaded directly from the Internet or the computing module 12 downloads the content for the supplementary device 14 and passes it on to the supplementary device 14. The latter case is useful in scenarios where the supplementary device 14 is not capable of accessing the Internet.

Communication between the supplementary device 14 and the computing module 12 could be according to one of the following examples. In one example, the computing module 12 cannot contact the supplementary device 14 but the supplementary device 14 can access the computing module 12. In that case, the computing module 12 places the information meant for the supplementary device 14 in a certain storage location. Using a listening function, the supplementary device 14 polls the computing module 12 to check for such information, and then obtains the information from the storage location. In another example, the supplementary device 14 can be accessed (such as where the supplementary device 14 includes a web server), wherein the computing module 12 records the network location (e.g., an IP address in an IP network) of and sends information to the supplementary device 14 at the network location. As those skilled in the art of networking will recognize, other processes for communication between the supplementary device 14 and the computing module 12 are possible.

Figure 2:
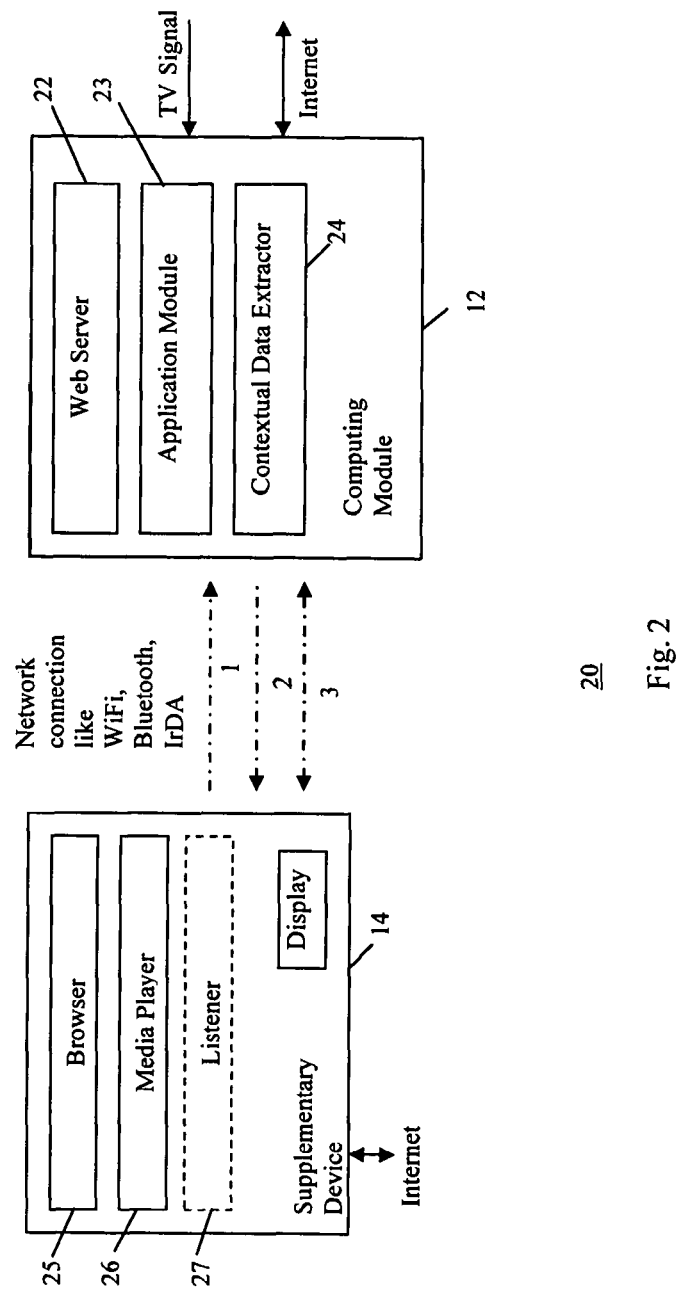
FIG. 2 shows a functional block diagram for supplementary content access using a supplementary device, according to an embodiment of the present invention.

FIG. 2 shows an example architecture 20 for the computing module 12 and the supplementary device 14 in the network 10, according to the present invention. The computing module comprises a user interface generating module such as a web server 22, an application module 23 and a contextual data extractor 24. The supplementary device 14 includes a web browser 25, a media player 26 and an optional listener 27.

The computing module 12 has access to metadata related to activities of the user on the network 10, such as metadata related to content accessed by the user. For example, if the user is watching TV, the computing module 12 can access EPG information, closed-captions, etc., for the TV program being currently watched. The contextual data extractor 24 extracts keywords from the metadata. In one example, keywords of potential interest to the user, based on, e.g., previous user activity in the network and/or the user profile, are extracted.

The web server 22 generates a user interface (UI) including the keywords, and the UI is displayed by the browser 25 on a display in the supplementary device 14. The keywords are available for display on the TV as well, as desired. Using the browser 25, the user can manually select one or more keywords to obtain additional information through the Internet via the web server 22. The selected keywords are also used by the application module 23 for obtaining additional related information. For example, the application module 23 implements one or more search functions such as, e.g., an online video application that uses the extracted keywords to pose queries to YouTube to obtain content therefrom. In another example, the application module 23 can implement a function that uses the keyword to obtain related news articles using news search engines on the Internet.

The default case is when the computing module 12 cannot contact the supplementary device 14. In this case, the supplementary device 14 polls or intermittently contacts the computing module 12 to determine if it has additional information. When the optional listener 27 is present in the supplementary device 14, the computing module 12 can inform the supplementary device 14 directly of changes via a message. The listener directs the message to the browser 25 and the browser 25 updates the displayed web page with the information inside the message.

FIG. 2 further shows an example sequence of steps, illustrated by the arrows 1, 2 and 3, wherein in a first step, the supplementary device 14 periodically sends a request for a UI to the web server 22 (polling), checking if the computing module 12 has new information. In response, in a second step if new information is available, the computing module 12 responds with a positive acknowledgement, wherein in step 3 the url generated by the web server 22 is displayed on the browser 25. In step 2 when new information is present at the computing module 12, it is sent to the supplementary device 14 directly (the listener module 27 can be contacted).

The web server 22 generates the UI, such as an HTML UI, including information obtained/searched by the application module 23, for use by the supplementary device 14. The information obtained by the application module 23 is related to the TV program displayed on the TV. The browser 25 displays the UI generated by the web server 22, for user viewing of the information obtained by the application module 23, and interaction therewith. For example, where the information displayed on the browser 25 includes a list of web-links obtained by the application module, the user can use the browser 25 to navigate the web-links on the Internet through the web server 22, without disrupting the TV program displayed on the TV. The media player 26 (e.g., MP3 player, video player) in the supplementary device 14 is used to play content accessed by the user through the browser 25.

The use of a web server and HTML for presentation is an example, and communication of information between the computing module 12 and the supplementary device 14 can be performed in other ways such as Bluetooth, etc. In another example, the web server 22 can dispense with creating a UI, and simply provide the information obtained by the application module 23 to the supplementary device 14 to display. In that case the supplementary device 14 includes a UI generator module to locally generate a UI for displaying information obtained by the application module 23.

Figure 3:
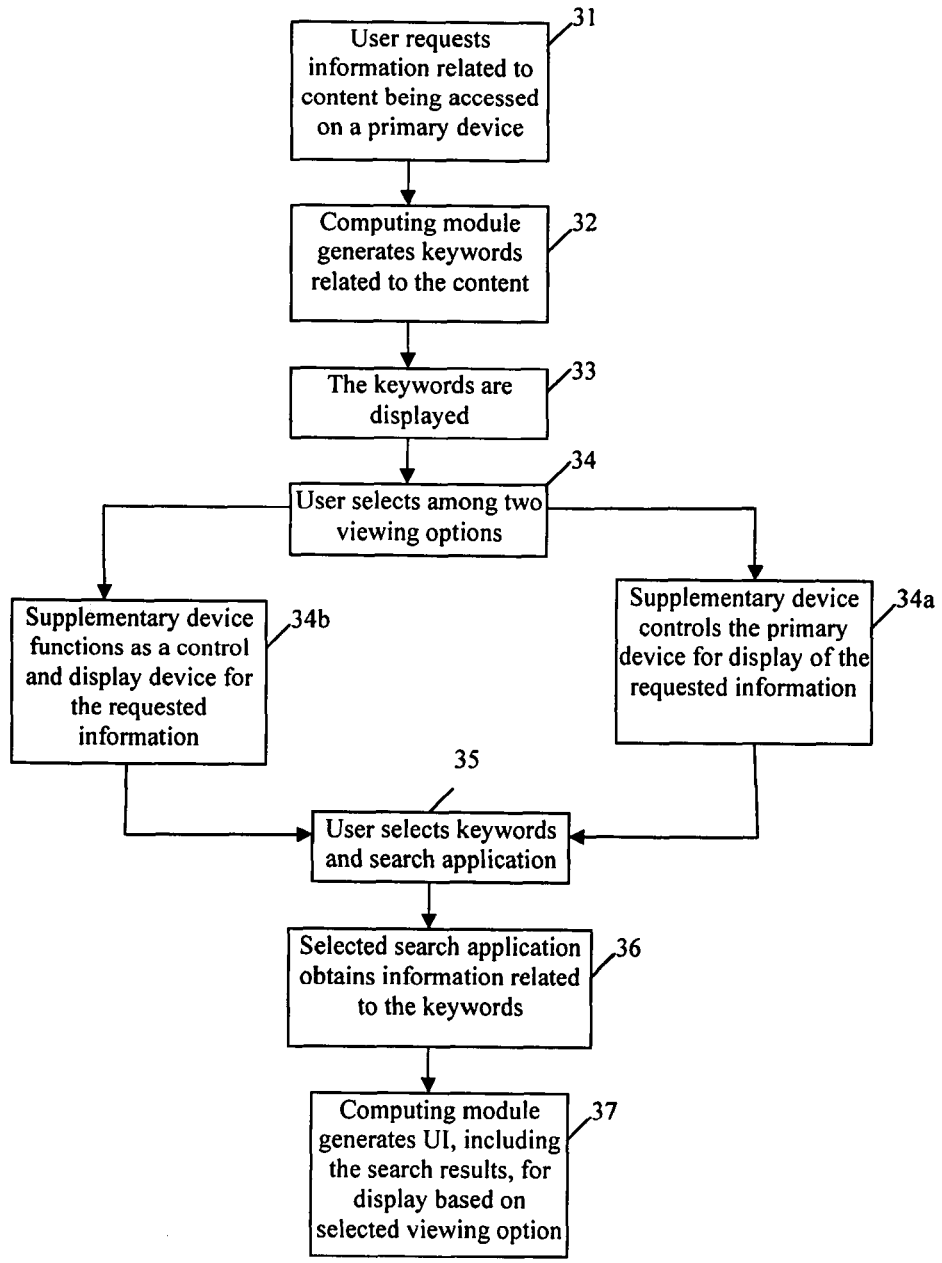
FIG. 3 shows a flowchart of a process content access using a supplementary device, according to an embodiment of the present invention.

FIG. 3 shows an example flowchart of a process 30 implemented by the architecture 20 in FIG. 2, wherein the computation device 12 (primary device) is implemented in the TV itself. The process 30 includes the following steps in using the supplementary device along with watching a program on the TV:

Step 31: When a user wishes to find more information about a program or a program excerpt being viewed on the TV screen, the user activates an "Info" button on the TV or the supplementary device.

Step 32: The computing module extracts keywords related to the TV program using various metadata sources.

Step 33: The keywords are displayed on the supplementary device and/or the TV.

Step 34: The user can choose between two options.

Step 34*a*: Use the supplementary device as a remote control where content related to the keywords is displayed on the TV but controlled using the remote control. When a button/hyperlink of the web page generated by the web server is activated via the browser in the supplementary device, a request message (e.g., for downloading a video or web page or new keywords) is sent to the computing module. The computing module responds to the supplementary device and changes the TV display to reflect the current state of the web page.

Step 34*b*: Use the supplementary device as a control and viewing device. When a button/hyperlink on the supplementary device is activated, requesting keywords or information related to keywords, the computing module sends a response back to the supplementary device, and the graphics on the TV display is not altered.

Step 35: The user selects keywords and a search application in the application module.

Step 36: The selected search application obtains information related to the keywords.

Step 37: The computing module generates a UI, including the search results, for display, based on the viewing option selected by the user in step 34.

The aforementioned hyperlinks are generated when a UI is generated by the web server. The hyperlinks can be links to video or web pages on the Internet (when both the computing module and the supplementary device are connected to the Internet). Hyperlinks can also be requests for new keywords from the computing module. When the supplementary device is not connected to the Internet, all the hyperlinks are messages to component devices to download content or web pages or requests for new keywords, etc. The response from the computing module is a HTML page either generated by the computing module or a page on the Internet, if the supplementary device is not connected to the Internet.

As noted, the application module provides one or more search applications for obtaining information. In one example, the application module 23 in FIG. 2 maintains the following application information:

| Application Name | Query Interface |
|---|---|
| Text Search Engine | SearchText(q) |
| Video Search Engine | SearchVideo(q) |

Then, the user uses the supplementary device 14 to choose an application from among the above applications, such as a video search engine. Then, when the user selects a keyword using the supplementary device 14, the application module 23 executes the method SearchVideo(q) where q is the query (e.g., "Canada" for a TV news program on the North American Free Trade Agreement) created by the contextual data extractor 24 based on the selected keywords. In another example, q can be the selected keywords themselves. The SearchVideo method performs a search using the query (e.g., on the Internet), and the application module 23 passes the search results to the web server 22 to construct a UI. The UI can be displayed on the supplementary device 14, and if desired, on the TV as well.

Figure 4:
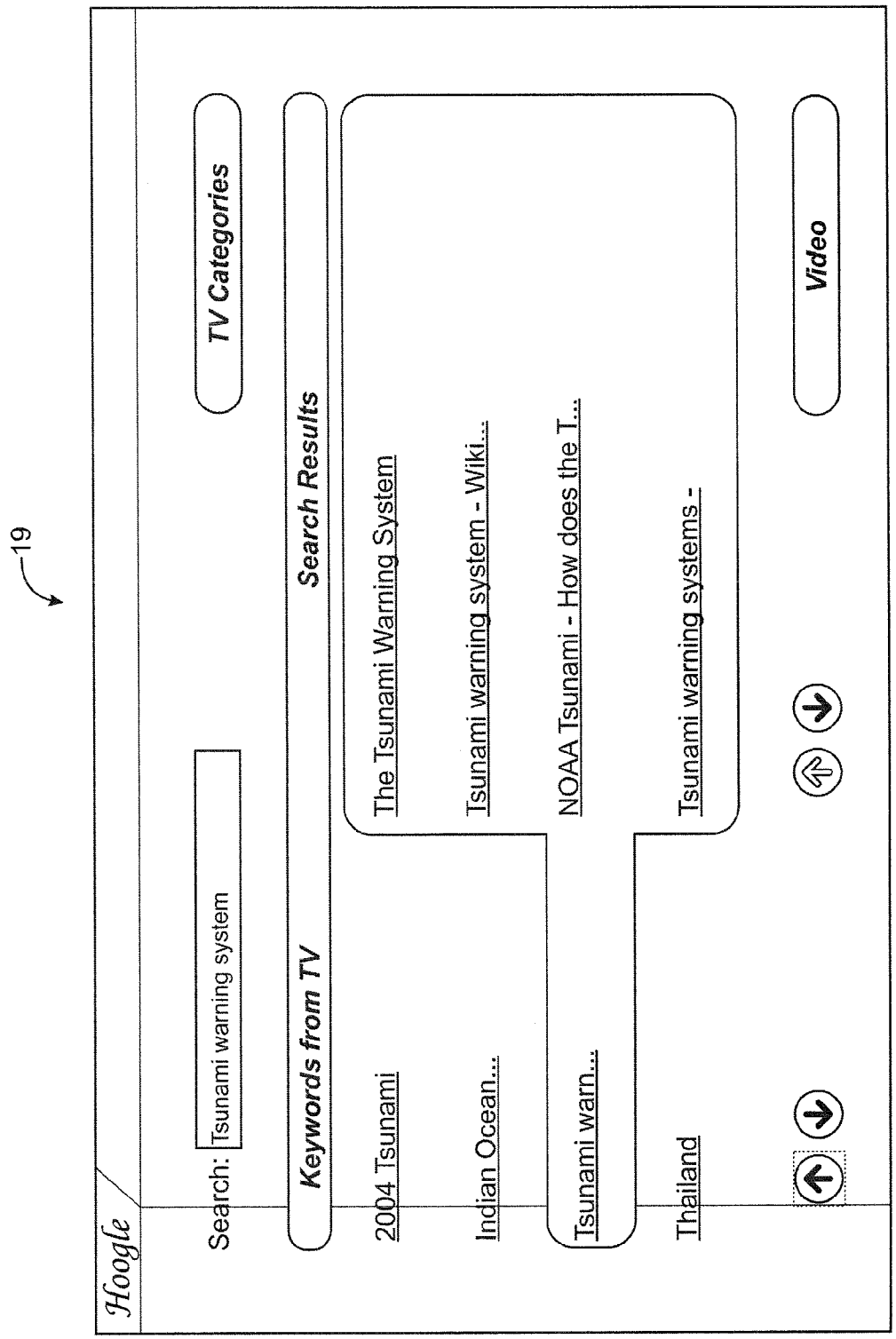
FIG. 4 shows an example screenshot illustrating content provided to a user, according to the present invention.

In one example shown in FIG. 4, if the TV program is a news program about natural disasters, and the related keywords generated by the contextual data extractor 24 are "2004 Tsunami", "Indian Ocean Earthquake", "Tsunami Warning", and "Thailand", then if the user selects the keywords "Tsunami Warning System" for searching and selects a text search engine application of the application module 23, then a UI 19 created by the web server 22 includes text search results for those selections within the UI 19, as shown by example in FIG. 4.

Figure 5:
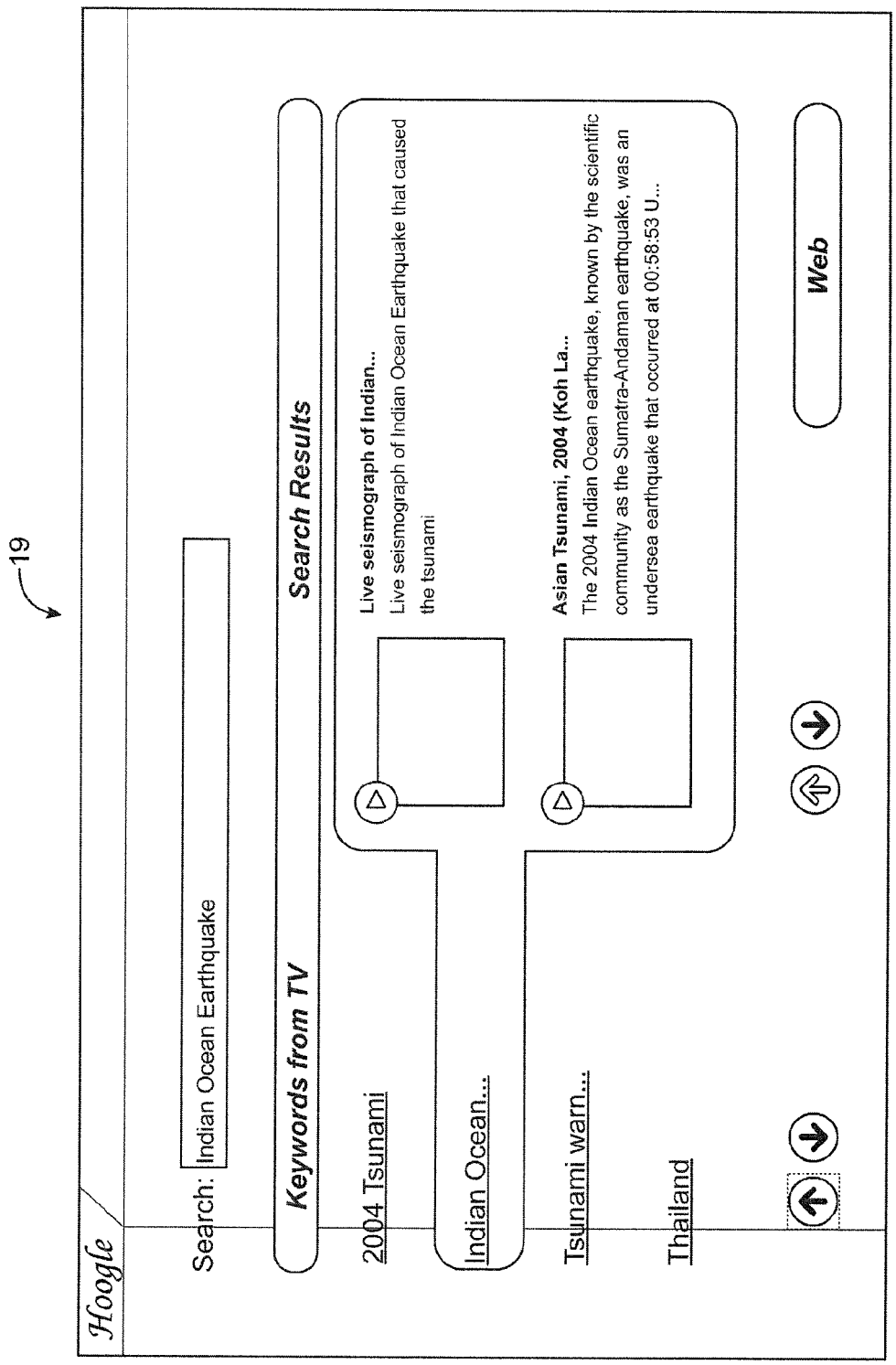
FIG. 5 shows another example screenshot illustrating content provided to a user on a supplementary device, according to the present invention.

In another example shown in FIG. 5, if the TV program is a news program about natural disasters, and the related keywords generated by the contextual data extractor 24 are "2004 Tsunami", "Indian Ocean Earthquake", "Tsunami Warning System", and "Thailand", then if the user selects the keywords "Indian Ocean Earthquake" for searching and selects a video search engine application of the application module 23, then a UI 19 created by the web server 22 includes thumbnails (and possibly text) of found videos in the UI 19, as shown by example in FIG. 5, and can be displayed on the supplementary device.

Figure 6:
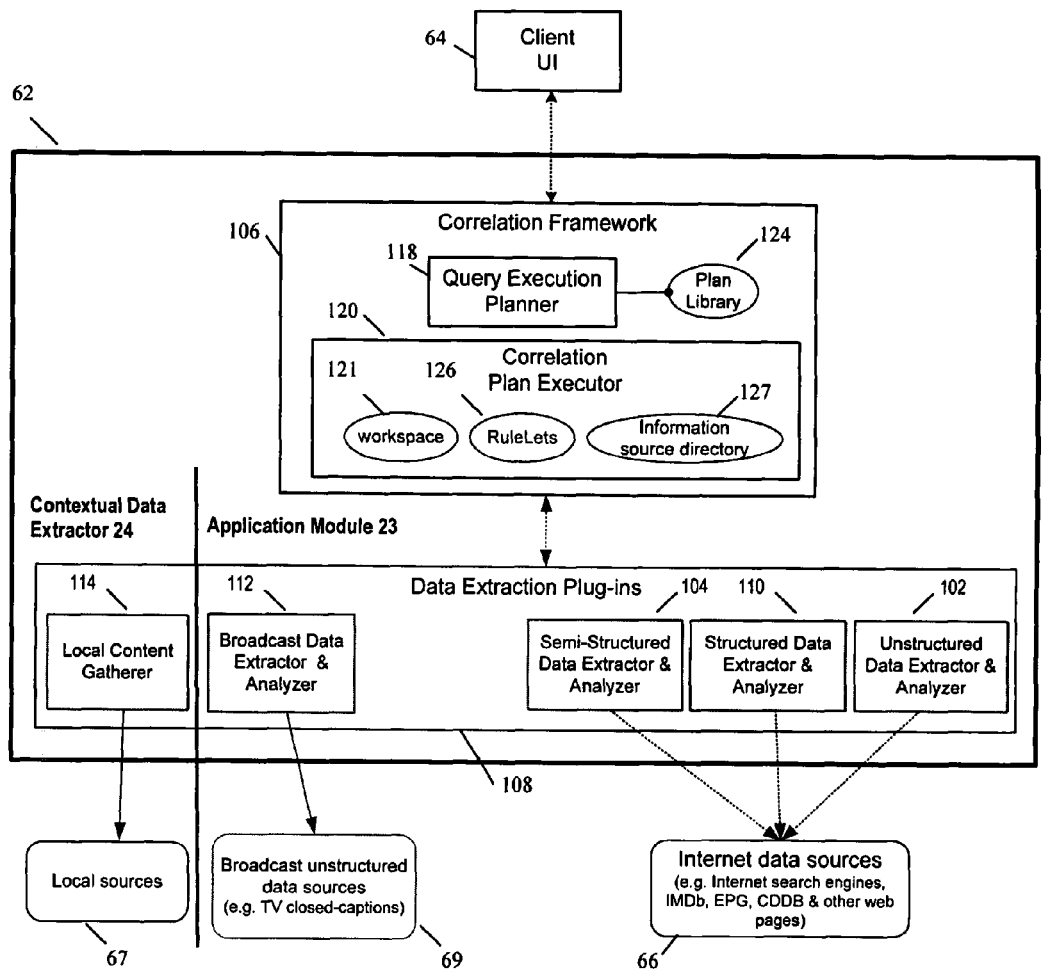
FIG. 6 shows an example implementation of a related-information generating component.

The application module 23 and the contextual data extractor 24 can be implemented in various ways. FIG. 6 shows an example implementation 60 for the application module 23 and the contextual data extractor 24, as a software component 62 that provides information to a client UI 64 representing the web server 22 and the browser 25. The client module 64 enables a user to request for more information from Internet data sources 66 about the TV program the user is watching. The component 62 includes a Correlation Framework (CF) 106 and Data Extraction Plug-ins (DEP) 108. The CF 106 provides interfaces and functionalities for use by the client module 64 to resolve user requests for various types of local and Internet information. The CF 106 includes a Query Execution Planner (QEP) 118, a Plan Library 124, a Correlation Plan Executor (CPE) 120, one or more RuleLets 126 and an Information Source Directory 127. A plan-step in a plan specifies the RuleLet to be executed, and also optionally specifies the type of the required data and scope of the output data (e.g., whether the data required should be on the Internet or on the home devices). The RuleLets 126 are specialized processes that execute a specific task (e.g., obtaining keywords related to a TV program, obtaining Internet links containing the biography of an artist). The workspace 121 is used by the CF 106 to temporarily store the results of executing each plan-step in a plan, for input to subsequent steps as needed. The Information Source Directory 127 maintains information about which data extraction plug-in should be used to extract a particular type of data.

The QEP 118 provides interfaces between the client module 64 and the functions of the CF 106. The Plan Library 124 includes various plans described in simple XML-like format. Each QEP 118 interface is associated with a particular plan; when an interface is executed, the QEP 118 passes on the associated plan to the CPE 120 along with any data passed on by the client/user. The CPE 120 executes the plan passed on by the QEP 118 using the DEP 108. A plan specifies the steps to be executed in order to resolve a particular type of query. An example of the CF 106 is described in related U.S. patent application Ser. No. 11/726,340, filed Mar. 21, 2007, entitled "A Framework for Correlating Content on a Local Network with Information on an External Network," incorporated herein by reference. The DEP 108 provides functionalities to extract data from different sources including the home devices/media repository and the Internet. The DEP 108 includes an Unstructured Data Extractor & Analyzer 102, a Semi-Structured Data Extractor & Analyzer 104, a Structured Data Extractor & Analyzer 110, a Broadcast Data Extractor & Analyzer 112 and a Local Content Gatherer 114.

The Unstructured Data Extractor & Analyzer 102 provides functionalities to extract data from general websites on the Internet via Internet search engines such as Google, Yahoo!, etc. The Unstructured Data Extractor & Analyzer 102 passes on the keyword chosen by the user/client to a search engine (e.g., API provided by the 'Yahoo!' search engine) to obtain related web-links for the keyword. The Semi-Structured Data Extractor & Analyzer 104 provides functionalities to extract data from Internet sources (such as zap2it) that provide semi-structured data (e.g., electronic program guide (EPG), internet movie database (IMDb)). The Structured Data Extractor & Analyzer 110 provides functionalities to extract data from Internet sources (e.g., compact disk database (CDDB)) that provide structured music metadata. The Broadcast Data Extractor & Analyzer 112 provides functionalities to extract and analyze data from metadata sources such as broadcast unstructured data sources 69 (e.g., EPG, closed-caption data from broadcast TV programs). The Local Content Gatherer 114 provides functionalities to extract and aggregate metadata for content (audio, video) available on local sources 67 (e.g., local content sources, local application states). In this example, the Local Content Gatherer 114 in the DEP 108 and the CF 106 provide the function of the contextual data gatherer 24. Further, the CF 106 and the remaining modules in the DEP 108, provide the function of the application module 23.

Figure 7:
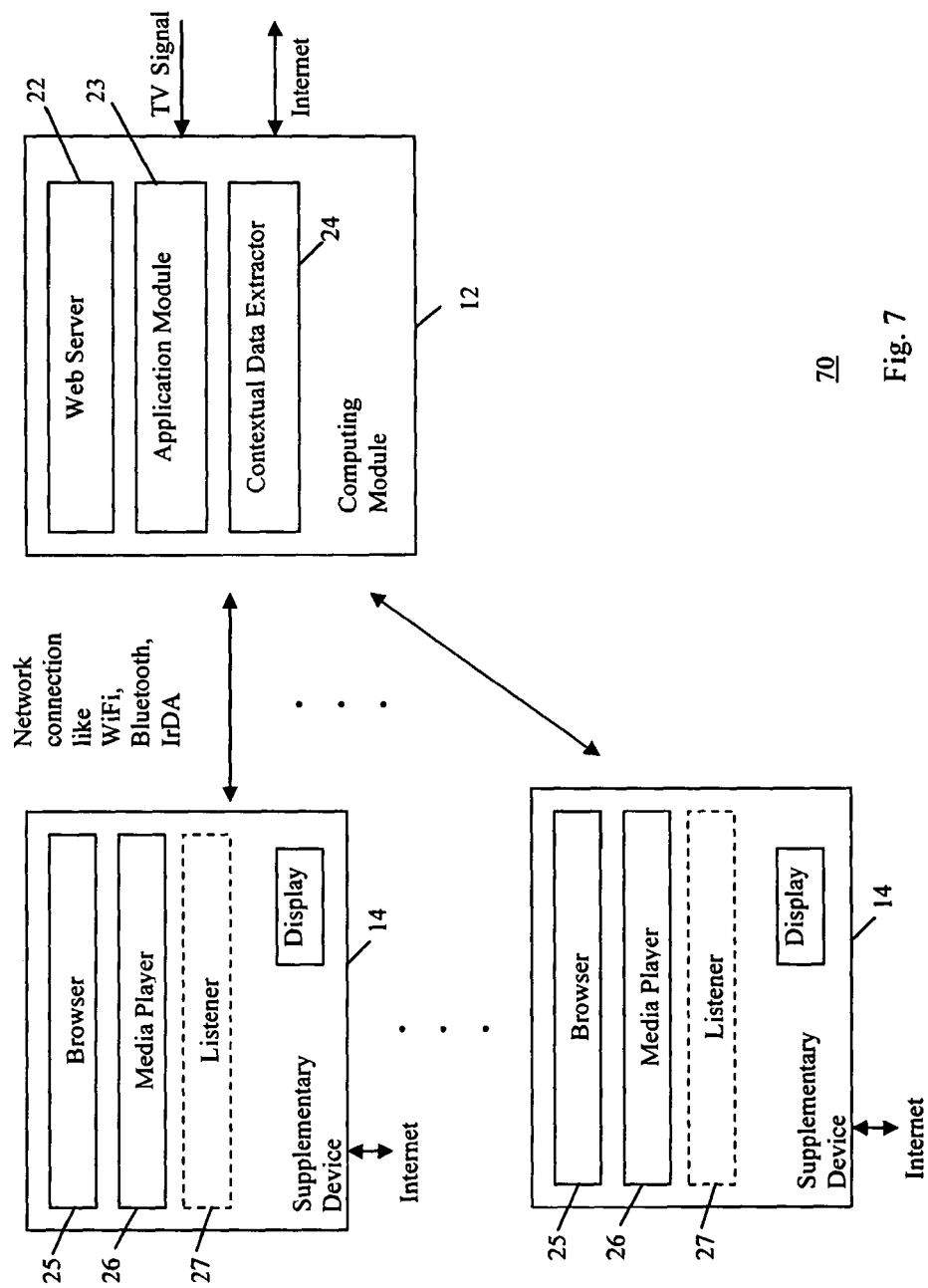
FIG. 7 shows an example architecture for supplementary content access using multiple supplementary devices, according to an embodiment of the present invention.

In one example, both the supplementary device 14 and the computing module 12 include hardware such as a microprocessor, memory and infrastructure for communication. Software modules implement the steps described hereinabove, for execution by processors in the supplementary device 14 and the computing module 12, according to the present invention. Further, as shown by example architecture 70 in FIG. 7, multiple supplementary devices can be used in conjunction with a primary device, wherein each supplementary device can be used by a user to access information related to a program on the primary device, independent of the other supplementary devices.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

The invention claimed is:

1. A method comprising:
monitoring content on a content playback device;
extracting contextual information related to the content;
analyzing the contextual information to derive key information including one or more keywords related to the content, wherein the one or more keywords are displayed on a supplementary device for selection;
receiving a selection of at least one of the one or more keywords;
receiving a selection of one of multiple search applications;
obtaining, via the selected search application, supplementary information related to the content based on the at least one selected keyword; and
sending the supplementary information to the supplementary device for display on the supplementary device while the content plays on the content playback device;
wherein the supplementary information comprises at least one of structured data and unstructured data.

2. The method of claim 1, further comprising:
generating a user interface that includes the supplementary information, wherein the user interface is sent to the supplementary device for display.

3. The method of claim 1,
wherein the multiple search applications comprises at least one of a video search engine and a text search engine.

4. The method of claim 1, wherein extracting contextual information related to the content comprises:
retrieving data from at least one of an electronic program guide (EPG) object for the content and a closed caption stream for the content.

5. The method of claim 1, wherein obtaining supplementary information related to the content based on the at least one selected keyword comprises:
forming one or more search queries for the supplementary information based on the at least one selected keyword; and
submitting the one or more search queries to at least one of an external network and a local network;
wherein the external network comprises at least one Internet search engine; and
wherein the local network comprises at least one local content search mechanism.

6. The method of claim 1, wherein obtaining supplementary information related to the content based on the at least one selected keyword comprises:
obtaining structured data related to the content from one or more Internet sources; and
obtaining unstructured data related to the content from one or more Internet sources.

7. The method of claim 6, wherein:
the unstructured data comprises one or more web links related to the content; and
the structured data comprises structured metadata related to the content.

8. The method of claim 1, further comprising:
modifying how the content is played on the content playback device based upon feedback received from the supplementary device in response to the supplementary device displaying the supplementary information;
wherein each selected keyword is selected from the one or more keywords using the supplementary device; and wherein the supplementary device is configured to periodically poll the content playback device for supplementary information.

9. A method comprising:

monitoring content on a content playback device;

extracting contextual information related to the content;

analyzing the contextual information to derive key information including one or more keywords related to the content;

sending the key information to a supplementary device, wherein the one or more keywords are displayed on the supplementary device for selection;

receiving a selection of at least one of the one or more keywords;

receiving a selection of one of multiple search applications;

retrieving, via the selected search application, supplementary information related to the content based on the at least one selected keyword; and displaying the supplementary information on the supplementary device while the content plays on the content playback device;

wherein the supplementary information comprises at least one of structured data and unstructured data.

10. The method of claim 9, wherein:

the content playback device is a television; and the supplementary device comprises a handheld consumer electronics (CE) device.

11. The method of claim 9, wherein retrieving supplementary information related to the content based on the at least one selected keyword comprises:

retrieving structured data related to the content from one or more Internet sources; and retrieving unstructured data related to the content from one or more Internet sources.

12. A method comprising:

receiving key information at a supplementary device from a content playback device, wherein the key information includes one or more keywords related to content on the content playback device, wherein the key information is derived from contextual information extracted by the content playback device, wherein the contextual information is related to the content, and wherein the one or more keywords are displayed on the supplementary device for selection;

receiving a selection of at least one of the one or more keywords;

receiving a selection of one of multiple search applications;

retrieving, via the selected search application, supplementary information related to the content based on the at least one selected keyword; and displaying the supplementary information on the supplementary device while the content is played on the content playback device;

wherein the supplementary information comprises at least one of structured data and unstructured data.

13. A content playback device comprising:

a display;

an interface configured to receive content;

a contextual data extractor configured to extract contextual information related to the content; and an application module configured to:

analyze the contextual information to derive key information including one or more keywords related to the content;

send the key information to a supplementary device, wherein the one or more keywords are displayed on the supplementary device for selection;

receive a selection of at least one of the one or more keywords;

receiving a selection of one of multiple search applications;

retrieve, via the selected search application, supplementary information related to the content based on the at least one selected keyword; and display the supplementary information on the supplementary device while the content plays on the content playback device;

wherein the supplementary information comprises at least one of structured data and unstructured data.

14. The content playback device of claim 13, wherein the supplementary device is a handheld CE device.

15. The content playback device of claim 13, wherein the application module is further configured to:

obtain structured data related to the content from one or more Internet sources; and obtain unstructured data related to the content from one or more Internet sources.

16. The content playback device of claim 13, wherein the content playback device is a television.

17. A supplementary device, the supplementary device comprising:

a processor;

a display; and a module configured to:

monitor content on a content playback device;

extract contextual information related to the content;

analyze the contextual information to derive key information including one or more keywords related to the content, wherein the one or more keywords are displayed on the display of the supplementary device for selection;

receive a selection of at least one of the one or more keywords;

receiving a selection of one of multiple search applications;

obtain, via the selected search application, supplementary information related to the content based on the at least one selected keyword; and send the supplementary information to the display of the supplementary device, wherein the supplementary device displays the supplementary information while the content plays on the content playback device;

wherein the supplementary information comprises at least one of structured data and unstructured data.

18. A content playback device, the content playback device comprising:

a processor; and a computing module configured to:

monitor content on the content playback device;

extract contextual information related to the content;

analyze the contextual information to derive key information including one or more keywords related to the content;

send the key information to a supplementary device, wherein the one or more keywords are displayed on the supplementary device for selection;

receive a selection of at least one of the one or more keywords;

receiving a selection of one of multiple search applications;

retrieve, via the selected search application, supplementary information related to the content based on the at least one selected keyword; and display the supplementary information on the supplementary device while the content plays on the content playback device;

wherein the supplementary information comprises at least one of structured data and unstructured data.

19. A non-transitory computer readable medium containing computer instructions stored therein for causing a computer processor to perform a method comprising:

monitoring content on a content playback device;

extracting contextual information related to the content;

analyzing the contextual information to derive key information including one or more keywords related to the content, wherein the one or more keywords are displayed on a supplementary device for selection;

receiving a selection of at least one of the one or more keywords;

receiving a selection of one of multiple search applications;

obtaining, via the selected search application, supplementary information related to the content based on the at least one selected keyword; and sending the supplementary information to the supplementary device for display on the supplementary device while the content plays on the content playback device;

wherein the supplementary information comprises at least one of structured data and unstructured data.

20. A non-transitory computer readable medium containing computer instructions stored therein for causing a computer processor to perform a method comprising:

monitoring content on a content playback device;

extracting contextual information related to the content;

analyzing the contextual information to derive key information including one or more keywords related to the content;

sending the key information to a supplementary device, wherein the one or more keywords are displayed on the supplementary device for selection;

receiving a selection of at least one of the one or more keywords;

receiving a selection of one of multiple search applications;

retrieving, via the selected search application, supplementary information related to the content based on the at least one selected keyword; and displaying the supplementary information on the supplementary device while the content plays on the content playback device;

wherein the supplementary information comprises at least one of structured data and unstructured data.

* * * * *